May 5, 1936.     F. HARVEY     2,039,793
ELECTRICAL DISTRIBUTION SYSTEM
Filed Feb. 25, 1933
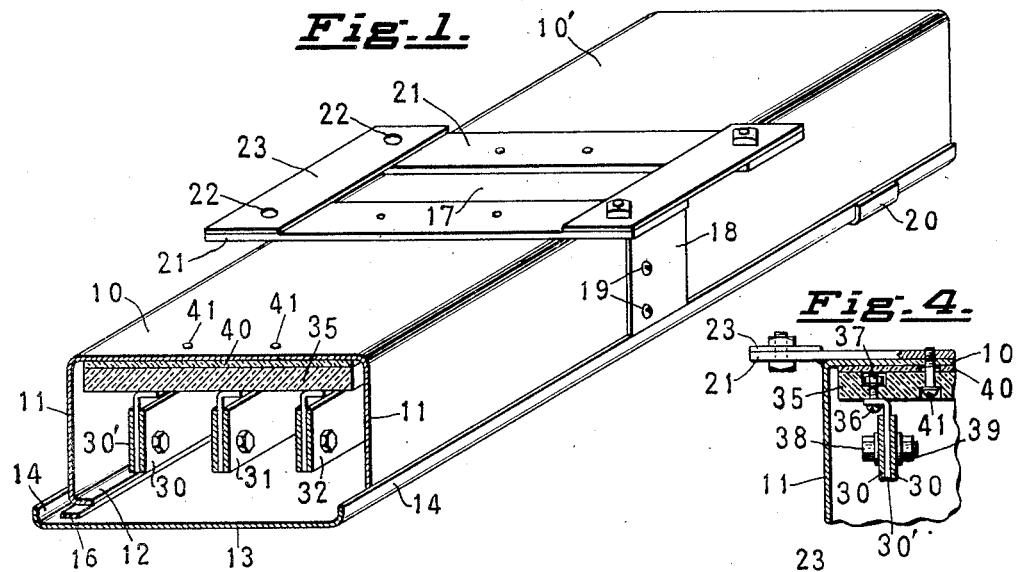
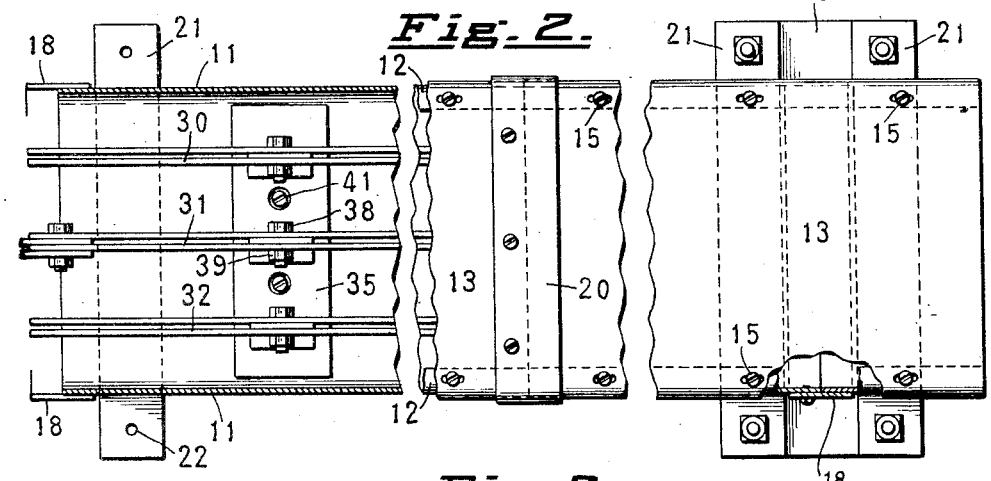
INVENTOR-
FRANK HARVEY,
BY
ATTORNEY- Patented May 5, 1936

2,039,793

UNITED STATES PATENT OFFICE 2,039,793

ELECTRICAL DISTRIBUTION SYSTEM

Frank Harvey, Covington, Ky., assignor to The Trumbull Electric Manufacturing Company, Plainville, Conn., a corporation of Connecticut Application February 25, 1933, Serial No. 658,487

4 Claims. (Cl. 247—3)

My invention relates particularly to apparatus for installing bus bars so that they can be extended from the usual distribution board or other inlet throughout the plant or building.

One object is to provide a simplified and less expensive installation.

Another object is to provide a construction which permits the installation of bare bus bars for current distribution and the elimination of wire and rigid conduits, except at points close to the means for current consumption such as light and power devices.

Another object is to provide an enclosed type of bus bar distribution which permits sufficient ventilation and yet is weather proof so that it can be used either for indoor or outdoor purposes.

Another object is to provide a construction which readily adapts itself to installation, inspection, alteration and repair.

Another object is to provide a construction which can be readily installed under varying conditions.

In its preferred form the invention contemplates the use of metallic channels made up of sections which are provided with butt-joints and overlapping reinforcing members. Each section is made up of an inverted trough-like member having a bottom plate or cover. The sections are made either of steel or other suitable metal.

The bus bars are supported inside of the channels by means of spaced blocks of insulating material and brackets.

In the drawing I have illustrated the invention as applied to a number of modifications.

Fig. 1 is a perspective view showing a joint between two sections of the distribution channel.

Fig. 2 is a view looking upwardly into such a channel.

Fig. 3 is a side view of the channel.

Fig. 4 is a cross sectional view of a fragment of the channel omitting the bottom plate.

Each trough section has a web portion 10 with side walls 11 and inturned bottom flanges 12. The bottom plate or cover 13 has side flanges 14 which are adapted to fit around the edges of the sides 11 of the main trough member.

The bottom plate is secured in place by a number of screws 15 which pass through openings or slots in the bottom plate and screw into the flanges 12. Where a water tight connection is desired a yielding gasket 16 may be inserted between the flange 12 and the bottom plate. These channel sections may be made up in any suitable lengths and will preferably be provided with splicing plates secured to one end of each section and adapted to overlap and be secured to the adjacent end of the next section. This splicing member may take the form of a U-shaped strap member 17 having downwardly extending arms 18 adapted to overlap the sides. This strap member will be suitably secured to one end of the section 10' and adapted to be detachably secured to the adjacent end of the next section 10 for instance by screws 19 so that the parts can be detachably connected together.

The bottom plate or cover may be made of any suitable length and have its joints connected, for instance, by means of a strap member 20.

The channel sections are adapted to be supported or hung from overhead beams or the like by bolts or hangers arranged at suitable intervals. To facilitate the attachment of such hangers I provide cross bars such as 21 suitably secured to the trough members 10 for instance by welding. These cross bars are provided with bolt or screw openings 22 at opposite ends for convenience in mounting.

The ends of adjacent cross bars 21 may be connected by tie plates such as 23 for reinforcing purposes.

By elongating the slots for the screws 15 provision can be made for allowing for expansion and contraction due to varying climatic and load conditions. In some cases the channels may constitute an integral part of the housing or building structure.

The bus bars such as 30, 31 and 32 may be formed of suitable material such as aluminum or copper and made of any desired length. Each of these bus bars is supported by a series of brackets each of which has a depending post-like member 33 and a foot 34. Each bracket is secured to an insulating cross bar 35 by a screw 36 and a nut 37, the latter being countersunk in a recess in the upper surface of the insulating cross bar.

The bus bar is secured to the post member 33 by a bolt 38 and lock nut 39. This method of installation permits a double set of bus bars attached to a single post as shown at 30 and 30'. In fact each bus bar may be made up of any number of strips of any suitable thickness. In this way the size of the cross section of the bus bar can be increased or decreased to suit any change of load required for the highest efficiency and safety.

The insulating blocks 35 may also be formed of a number of layers of insulating material such as ebony wood, compressed asbestos and the like.

One layer 40 may serve to cover the upper ends of the screws 36 and the nuts 37 and thus insure perfect insulation between the bus bar brackets and the metallic channels. Each supporting block is secured to the channel by a number of screws 41 which pass through the supporting block 35 and its cover 40 and through the upper web 19 of the trough and screws into the cross bar 21 previously mentioned. The bus bars and the brackets may be provided with slots such as 42 to allow for relative longitudinal adjustment of the bolts 38. In some cases the ends of the bus bars may be provided with two slots 43, 43 at their ends to facilitate connection between the bus bars.

By the foregoing construction I am able to provide and entirely safe and effective installation without the necessity of providing extensive insulating linings for the channel sections such as have been used in some cases.

The construction is applicable to both indoor and outdoor use and can be made entirely waterproof when required, especially for instance where the bus bars are used as feeders from outdoor transformer banks to individual buildings.

Such systems may employ separate installations for power and lighting or individual compartments may be provided for carrying the power and lighting bus bars.

It will also be understood that the troughs and covers will ordinarily be made of standard sections so that they will be interchangeable. The supports for the bus bars will be arranged at suitable intervals depending upon the load to be carried. Convenient spacing for some installations is four feet between centers of the bus bar supporting blocks.

The foregoing construction provides a convenient, economical and safe method of distributing electric power without the use of long lines of conduit and insulated wire and cables.

In such a system the installation cost is practically the entire cost, as the cost of upkeep is negligible. There is practically nothing to wear out in such a system and the only after cost is that due to radical changes or extensions in the installation. When necessary to move the installation from one location to another there is practically no loss of material and only the expense incidental to the labor involved.

As the bus bars are entirely enclosed the system is safe as contact with live parts by unqualified persons is made impossible. As distribution cables and insulated wire are done away with in the main bus bar sections all danger due to deterioration is avoided.

It will be understood of course that the channel sections will be provided with outlets and taps or branch boxes of a suitable character at desired points to suit the peculiarities of individual installations.

I claim:

1. An electrical distribution channel consisting of an inverted trough-shaped member and a bottom plate member, one of said members having flanges overlapping the edges of the other member, a plurality of bus bars mounted in said channel, insulating supporting blocks secured in the trough-shaped member and connected to the respective bus bars, cross bars secured to the top of said trough-shaped member for supporting the channel, and screws passing through said blocks and trough-shaped member and into said cross bars.

2. An electrical distribution channel consisting of inverted trough-shaped members, insulating supporting blocks secured in said members, a bus bar housed within said channel and carried by said insulating blocks, a splice piece connecting adjacent ends of adjacent members, cross bars secured to the top of said inverted trough-shaped members along side of said splice piece and extending laterally beyond the sides of said members and securing members passing through said trough-shaped members and connecting said supporting blocks to said cross bars and a bottom plate having its edges connected detachably to the edges of the trough-shaped member.

3. An electrical conduit having inverted trough-shaped members for containing the bus bars, cross bars secured to the tops of the trough-shaped members near their ends and having their ends extending beyond the edges of the trough-shaped members, tie pieces connecting the outer ends of adjacent cross bars along side of the trough-shaped members and bottom plates secured to the lower edges of the trough-shaped members and removable therefrom without disturbing the cross bars.

4. An electrical conduit having inverted trough-shaped members for containing the bus bars, cross bars secured to the tops of the trough-shaped members near their ends and having their ends extending beyond the edges of the trough-shaped members, tie pieces connecting the outer ends of adjacent cross bars alongside of the trough-shaped members and a splice piece connecting the adjacent ends of adjacent trough-shaped members between adjacent cross bars.

FRANK HARVEY.